United States Patent [19]

Ament

[11] Patent Number: 4,932,704
[45] Date of Patent: Jun. 12, 1990

[54] FLEXIBLE, REMOVABLE TOP COVER SYSTEM FOR COVERING A STORAGE SPACE

[75] Inventor: Eduard Ament, Aichwald, Fed. Rep. of Germany

[73] Assignee: Baumeister & Ostler GmbH & Co., Aichwald, Fed. Rep. of Germany

[21] Appl. No.: 360,475

[22] Filed: Jun. 2, 1989

[30] Foreign Application Priority Data

Jun. 10, 1988 [DE] Fed. Rep. of Germany ....... 3819766

[51] Int. Cl.$^5$ ................................................. B60R 5/04
[52] U.S. Cl. .................................. 290/37.16; 296/100; 160/84.1
[58] Field of Search ............................. 296/37.16, 100; 160/84.1

[56] References Cited

U.S. PATENT DOCUMENTS

| | | | |
|---|---|---|---|
| 3,756,650 | 9/1973 | Michel | 296/100 |
| 4,262,955 | 4/1981 | Duda | 296/37.16 |
| 4,518,194 | 5/1985 | Kirkham et al. | 296/100 |
| 4,547,014 | 10/1985 | Wicker | 296/100 |

*Primary Examiner*—Robert R. Song
*Attorney, Agent, or Firm*—Frishauf, Holtz, Goodman & Woodward

[57] ABSTRACT

To provide a removable cover, especially for a luggage or trunk space of a motor vehicle, a pair of essentially parallel spaced guide rails (9, 11) are secured to the side walls of the vehicle at a level preferably about the height of the back seat of the vehicle and in a common plane which extends across the space. The cover element is formed by a flexible web (15) which is coupled to and supported by a plurality of struts slidable in the guide rails. The guide rails terminate in, or are formed by a holder or retention section which is adapted to receive a receptor element (17), against which the struts can be pushed, with the web then being gathered in folds. The receptor element is removable from the holder or retention section, and a spring (62) thereon holds the gathered web and the struts in position in the receptor element. When installed in the guide rails, that is in the vehicle, the receptor element is spring-biassed for alignment with the end portion (16) of the guide rails, so that the web and the struts supporting the web can be pulled out, the struts supporting the web transversely across the trunk space. Preferably, the struts are hollow tubular elements which terminate in spring-loaded telescopically received ends, for example of low-friction plastic material, to provide resilient connection, thereby preventing rattling, and ensuring easy sliding movement.

20 Claims, 4 Drawing Sheets

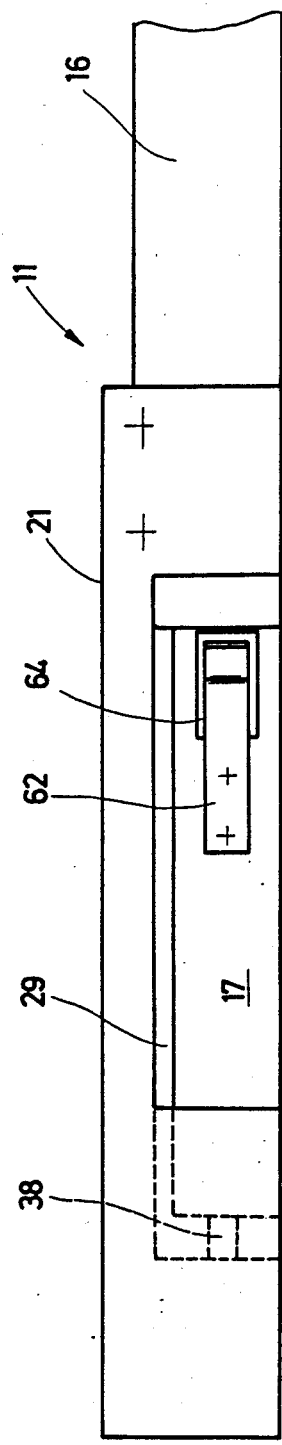
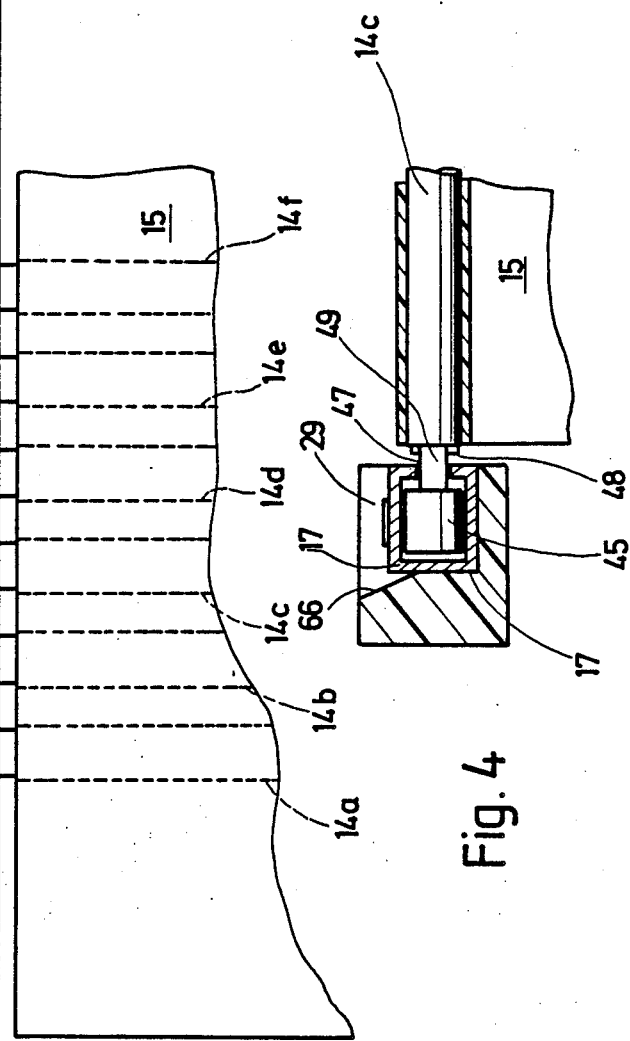
Fig. 3
Fig. 4

FLEXIBLE, REMOVABLE TOP COVER SYSTEM FOR COVERING A STORAGE SPACE

The present invention relates to a cover system especially adapted to cover an open region of a storage space and particularly the cargo region of a hatchback or stationwagon automobile to hide articles, such as luggage, therein, while also forming a surface to support lightweight articles, such as hats, umbrellas or the like; and, in general, to a flexible cover system for covering a confined storage space open at the top.

BACKGROUND

Stationwagons, hatchback cars, small vans and the like frequently have luggage, loading or storage space behind the rear seat of the vehicle. Such space may be visible from the outside. No covers are usually provided in stationwagons, small trucks, vans and the like. The covers would interface with placement of tall articles in the storage space of if, for example, the rear seat of the vehicle can be folded back to increase the storage and cargo space of the vehicle.

Many users find the open, visible area behind the rear seat undersirable. Covers for the storage space are known which are attached to the rear or back portion of the rear seat of the vehicle or close thereto on the vehicle frame. Such covers, usually rolled up on rollers, can then be pulled across the loading space to block view thereinto.

Covers of the type which are known use, usually, spring-loaded rollers, similar to window shades. The cover web which then extends across the loading space, however, in order to be sufficiently flexible, cannot accept placement of any articles thereon; even the own weight of the cover will causes it to sag, particularly in the central portions thereof. The web is highly sensitive with respect to articles or loading placed thereon.

THE INVENTION

It is an object to provide a cover and covering system for spaces open at the top, particularly for storage or loading spaces behind the rear seats of vehicles, such as stationwagons, small trucks, vans, hatchbacks and the like, which is readily removable from the vehicle to permit carrying of large or bulky loads, can be readily replaced, and which is still capable of sustaining some loading thereon without sagging.

Briefly, a pair of essentially parallel spaced guide rails are provided, located in a plane which extends across the space. The guide rails, for example, are secured to the vehicle frame, or to the side walls of the vehicle. The cover element which is stretched across the space is guided in the guide rails and is formed of a plurality of struts, for example rods, rail elements or the like, which extend across the space and which are connected by a flexible web in such a way that, when the web is pulled across the space, the rods will support the web along the length thereof, but, when the web is pushed together, the rods and the web will be gathered to a small longitudinal space. Receptor means are located in alignment with the rails and of sufficient length to receive all the rods, with the gathered web, and, preferably, include retention means such as a spring. The rods, with the gathered web, can then be pushed into the receptor means and the receptor means, which e.g. include structural elements which are removable, can be lifted out from the adjacent portion of the rails, together with the cover element formed by the gathered struts and web, thereby providing unimpeded access to the storage or loading area formed by the space.

The arrangement has the advantage that the struts hold the web, when extended, straight between the guide rails, while, additionally, ensuring gathering of the web and folding together of the portion of the web therebetween in orderly and neat manner. It is not necessary to provide any specific roll-on structure, such as is customary with prior art spring-type rollers, which, additionally, require some skill when they are rolled up to prevent slanted or canted rolling. The receptor elements permit ready removal of all the struts and webs, when pushed together, and, in accordance with a feature of the invention, are so constructed that they can be merely lifted off or out of the path of the guide rails, so that all the struts and the webs can be removed simultaneously in a simple pivoting or tilting motion, which can be carried out by one hand of a user, without requiring any strength or tools. To reassemble the system, the pushed-together struts with the gathered or collapsed web hanging in folds, and retained in this position by the receptor elements, can be reinserted at the ends of the guide rails without necessity of threading individual struts into the guide rails. As soon as the receptor elements are reassembled, the web can be pulled out or expanded, thus permitting the folds between the webs to stretch and form a surface which can support light articles, such as small packages, hats, unbrellas or the like, without sagging.

In accordance with a feature of the invention, the receptor means, in their simplest form, are structural elements which include portions of the guide rails and which can be separated from the remainder of the guide rails, secured to the vehicle. By positioning the receptor means, e.g. in straight, continuous alignment with the guide rails, transition of the struts from the fixed guide rails to those portions thereof which form part of the receptor means structural elements is simple and does not require any special coupling portions.

Perferably, at least one of the struts, for example an end strut, is securely attached to the receptor means, thus preventing release or removal of the struts from the receptor means and, when the struts are in the receptor means, forming a unit without loose parts which may become detached or lost.

DRAWINGS

FIG. 3 is a top view of the region of the guide rails which includes the receptor element and the cover element in gathered, that is, collapsed position;

FIG. 4 is a fragmentary detailed cross-sectional view, in transverse section with respect to FIG. 3, parallel to the struts of the cover.

DETAILED DESCRIPTION

Figure 1:
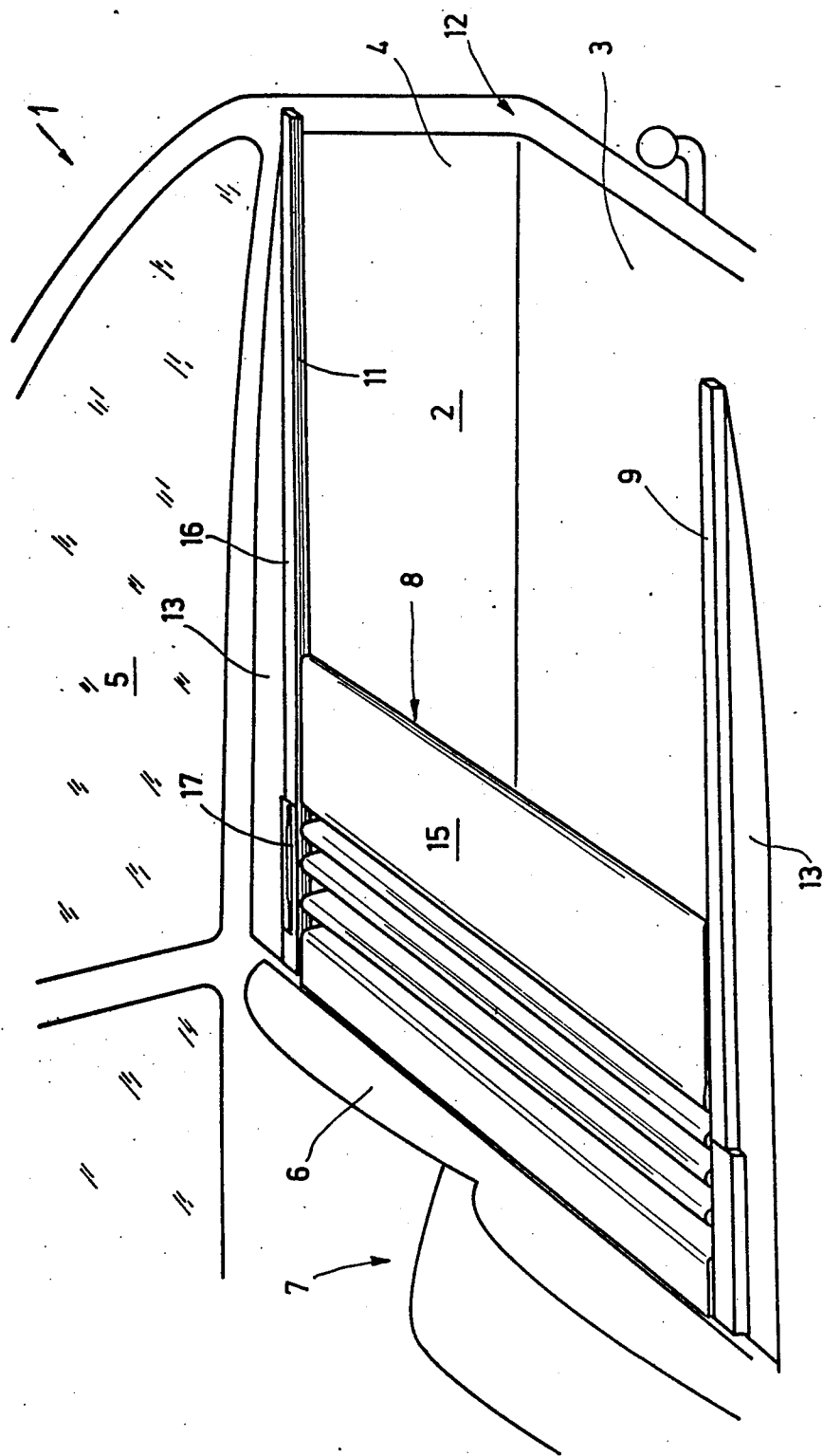
FIG. 1 is a schematic, perspective view of the storage space behind the back seat of a stationwagon, with a cover element partly positioned thereacross.

The invention will be described in connection with a cover for the luggage compartment or trunk of a stationwagon, shown generally at 1 in FIG. 1. The trunk or loading space 2 has a bottom 3 and two side walls, of which only side wall 4 is visible. A rear window 5 is located above the trunk space. The forward portion of the trunk space is terminated by the rear part of a rear seat 6. A rear bench seat 7 is provided in the vehicle. In many vehicles, the back 6 can be folded or pivoted forward, and the seat 7 lifted up or removed to extend the storage or loading space 2.

A cover 8 is provided to hide articles placed in the storage trunk 2. It is located somewhat beneath, preferably closely beneath the lower edge of the rear side window 5, for example roughly at the level of the upper edge of the rear seat 6.

In accordance with a feature of the present invention, the cover system includes two guide rails 9 and 11, secured closely beneath the lower edges of the side windows 5 to or on the side walls 4 of the vehicle. The guide rails 9 extend from the rear end of the back seat 6 up to loading or rear opening 12 of the vehicle. The loading opening can be closed by a suitable door, not shown. The space between the guide rails 9 and 11 and the side walls 4, which may be slightly bulged outwardly, is covered by filler strips 13.

The guide rails 9 and 11 guide the cover element which, in accordance with feature of the invention, is formed by tubular struts generally shown at 14, and specifically by struts 14a, 14b...14f (FIG. 3) positioned parallel to each other and guided with their end portions in the guide rails 9 and 11. The tubular struts 14a...14f support a web 15. They are attached to the bottom side of the web, uniformly spaced from each other, so that when the cover 8, that is, the web 15 is extended, the struts 14a... 14f are spaced uniformly throughout the length of the loading area or trunk 2. The web 15 is an essentially rectangular piece of material, for example opaque plastic foil which, if desired, may be reinforced with or bonded to textile material. The width of the web 15 corresponds to the distance between the guide rails 9 and 11. The length of the web 15 corresonds to the distance between the back 6 of the back seat from the trunk opening 12. The last strut 14f is coupled to the edge of the web 15 adjacent the loading opening 12. The first one, that is, the strut which is most forward with respect to the motor vehicle, is also coupled to the web 15 and, when the cover system is in place, is fixed in position adjacent the back of the rear seat 6. As can readily be seen, by pushing or pulling on the last strut 14f towards or away from the loading opening 12, the cover web 15 can be spread across the entire loading or trunk space 2 in order to close off the trunk, upwardly. It is, of course, readily possible to push back the cover 15 towards, the rear seat 6, in which case the cover will form folds between the struts 14a...14f, which hang down, if the struts 14a to 14f are pushed tightly together, see FIG. 3. When all the struts are pushed tightly together, see FIG. 3, the web and the struts are gathered in a bunch. Of course, the web, if desired, can be secured to the struts 14b...14e intermediate the terminal struts 14a and 14f. Any suitable method of attachment may be used, for example adhesives.

The web 15, together with the struts 14a to 14f, all gathered together, can be removed as a unit, for example if the useful loading area of the trunk space 2 is to be increased by folding back the seat back 6 and, if suitable, also the rear seat 7. To permit ready removal of the web 15-strut 14 combination, the rails 9 and 11 are subdivided into fixed poritons 16 and removable portions 17. The removable portion 17 forms a receptor means for the web-strut combination 15, 14 when collapsed or gathered; in its simplest form, it is a structural element which is removable to form a receptor, or receptor element. The length of the receptor elements 17 corresponds to that distance which is required by the struts 14a...14f when the web 15 is completely gathered. The two guide rails 9 and 11 are mirror-identical; the subsequent description, thus, will deal only with one of them, namely rail 11, and it is to be understood that a mirror-identical retention element to element 17, to be described in detail, will also be provided.

Figure 2:
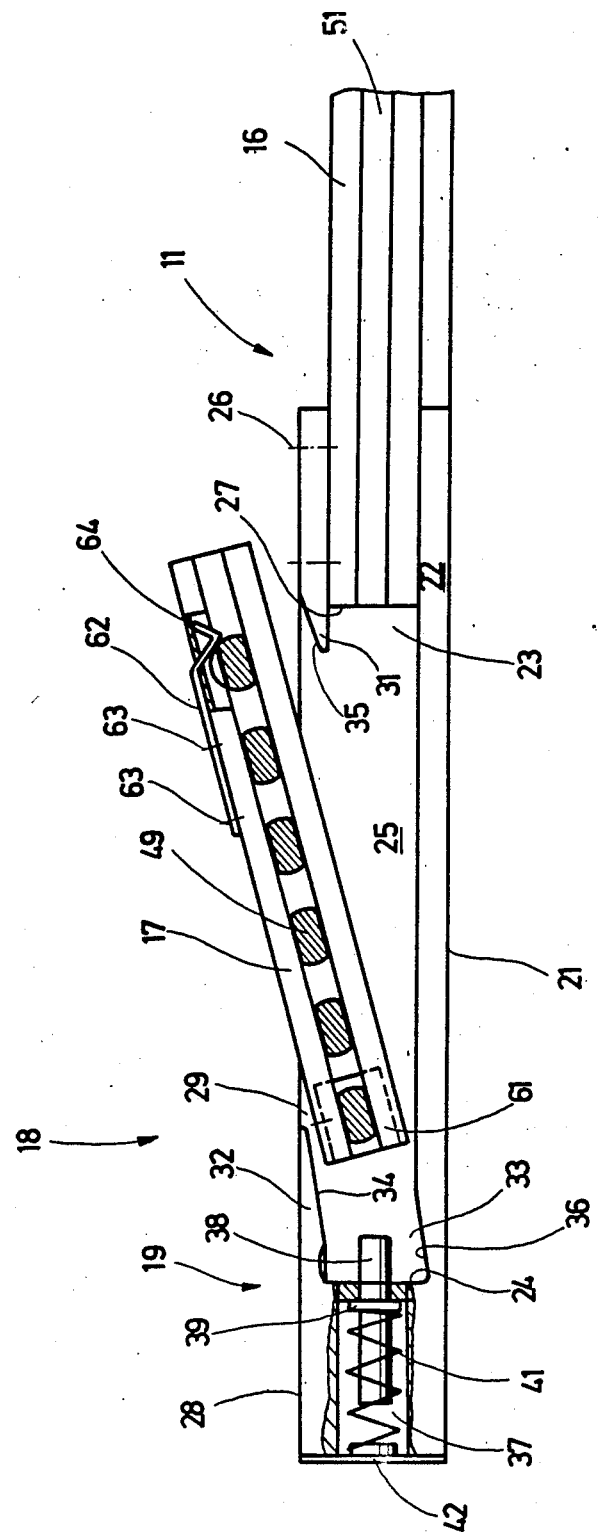
FIG. 2 is a side view, partly in section, illustrating the cover element in a receptor, in partially removed position, and showing, in fragmentary form, the guide rails.

FIG. 2 illustrates the forward end of the portion 16 of the guide rail 11 which includes a holder arrangement 18 with a snap-in arrangement 19 for the removable receptor element 17. The holder 18 is formed by an essentially rectangular, elongated block 21 which has a groove or recess 23 of essentially L-cross section on the plane side 22 which faces the opposite rail 9. The groove 23 terminates in a flat face wall 24, spaced from the forward end of the block 21. The wall 24 extends at right angle to the longitudinal extent of the groove 23. Groove 23 forms a receiving portion or pocket 25 for the receptor element 17.

The rearward portion of the groove 23 in the block 21 receives an end section of the fixed guide rail portion 16. As best seen in FIG. 2, rail 16 extends to some extent into the groove 23. The cross section of the groove 23 corresponds to the outer dimensions of the cross section of the guide rail 11. The relative position between the holder arrangement 18 and the installed guide rail portions 16 is obtained by coupling the block 21 to the end parts of the portion 16 of the guide rail 11 by screws 26, which are shown only schematically.

The guide rail 11, in the region of the groove 23, is formed with flat side 27, extending parallel to the face wall 24, and spaced therefrom just slightly more than the length of the receptor element 17.

A generally rectangular removal opening 29 is provided in the upper side wall 28 of the block 21, when the block 21 is installed in the motor vehicle, as best seen in FIG. 2. The removal opening 29 is as wide as the depth of the groove 23 and is length, measured in the direction of the guide rail 11, is somewhat less than the length of the receptor element 17. As seen in FIG. 2, a projection 31 will thus be formed in the vicinity of the end wall 27, which defines also the end of the reception pocket 25 formed by the groove 23. A further prjection 32 will be formed in the vicinity of the forward end wall 24. The reception pocket 25 thus will receive a depression-like auxiliary pocket 33 which is located immediately adjacent the wall 24.

To facilitate removal and insertion of the receptor element 17, projection 31 is chamfered at its upper side 35 and projection 32 is chamfered at the lower side 34, both in the direction of the free ends of the respective projections, to form converging guide surfaces. Further, the auxiliary pocket 33 is formed with a bowl or further pocket-like depression 36 so that the receptor element 17 can tilt or pivot, as seen in FIG. 2, upon removal or insertion, without interference of the back end or back edge of the element 17 with the bottom wall of the groove 23.

The receptor element 17 can be locked in position in the pocket 25 by a spring arrangement. The essentially rectangular block 21 is formed at its forward end with a blind, stepped bore 37. The smaller portion thereof is carried through the wall 24. A cylindrical push bolt or rod 38 is longitudinally slidable in the stepped bore 37. The free end of the bolt 38 extends into the pocket 25.

The end beneath or behind the stepped bore 27 has a ring shoulder 39 against which a spiral spring 41 engages. Spring 41 is supported at its other end on a cover cap 42 which closes off the bore 37.

The receptor element 17 has the same generally C-shaped profile as the fixed portions of the rail 11 when it is installed in the pocket 25; it, thus, forms a smooth prolongation of the rail portion 16.

Figure 5:
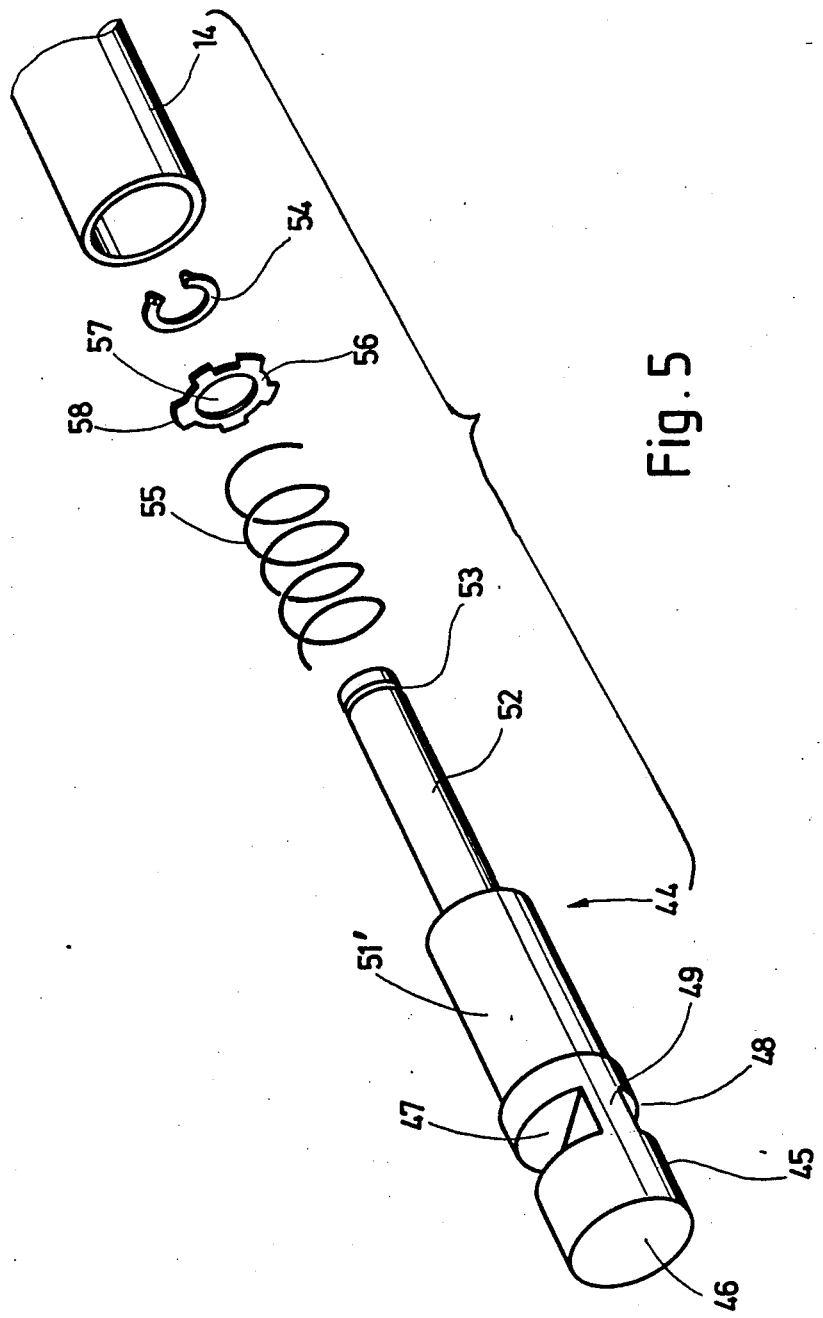
FIG. 5 is an exploded perspective view of a guide structure for the struts.

FIG. 5 illustrates the struts 14a to 14f in detail. These struts are all identical and, as seen in FIG. 5, are formed of tubes which are slightly smaller than the spacing between the guide rails 9 and 11. The open end of the tubes have a guide element 44 inserted therein which is telescopically slidable in the respective strut 14. The guide element 44 has a cylindrical head 45, projecting from the strut 14, which is formed with two parallel grooves 47, 48, spaced from its facing end 46, and extending parallel to a diameter across the head 45. A web 49, with parallel flanks, will then remain. The web 49 corresponds in thickness to the width of the slit which is defined by the C-shaped profile of the guide rails 9, 11. The remainder of the end element 44 is formed by a cylindrical portion 51'. The flanks of the rails 9, 11, adjacent the slit (FIG. 2), thus fit into the spaces or grooves 46, 47 in the end element 44. The diameter of the cylindrical head 45 corresponds approximately at least to the clear width of the inner space behind the flanks of the rails 9, 11. FIG. 2 illustrates the web portions 49 in cross section.

The cylindrical head 45 is extended towards the tubular portion 14 by a cylindrical extension 51 of somewhat smaller diameter. The diameter of the cylindrical portion or pin element 51' corresponds to the inner diameter of the strut 14. To permit easy sliding of the guide element 44 in the rails 9, 11, head 45 and the pin 51 are preferably made of a single piece of plastic, for example of low-friction plastic such as nylon.

A steel pin 52 is coaxially inserted into the pin portion 51. The steel pin 52 has a groove for a C-ring 54. A spiral spring 55 is seated on pin 52 which, on the one side, engages against the cylindrical pin portion 51'. The other end thereof can engage against a press-on end counter disk 56, engaged against the C-ring 54. The retention disk 56 has a concentric hole 57 and anchors the guide element 44 in the tubular strut 14. The disk 57 has outwardly radially projecting teeth 58, similar to a star lock washer. The flaps or teeth 58 have a diameter which is just slightly greater than the internal diameter of the tubular strut 14. The unit can be assembled together by inserting the guide element 44, the spring 55 thereon, the disk 56 and the C-clamp 54 into the strut 14. The teeth 58 will deflect or bend slightly and permit their insertion into the strut 14. Upon a slight pull on the end element 44, then, the teeth 58 will tend to straighten out and bite into the inner wall of the tube 14, thus preventing further movement of the disk 56 within the tubular element 14. This permits the tubular element to be axially movable while axially biassing the element 44 to project outwardly by the spring 55.

The arrangement of the grooves 47, 48 on the guide rails, biasses by the spring 55, effectively prevents rattling of the struts 14a...14f by engagement of the flanks of the grooves 47, 48 with the adjacent edges of the guide rails.

In accordance with a feature of the invention, the leading strut 14a is irremovably retained in the receptor 17 by an insert 61 (FIG. 2) which stops or arrests the element 14a at the forward end of the receptor 17. Simultaneously, the filler 61 provides a stop against which the bolt 38 can engage.

Operation, insertion and removal of the cover

Let it be assumed that the cover system is in the position shown in FIG. 1. To remove the web 15-strut 14 combination, the cover unit is gathered or collapsed by pushing the web combination or unit towards the front of the vehicle in the guide rails 9, 11, that is, in the direction of the rear seat back 6. This moves all the prior positioned struts 14b...14e also in the direction of the receptor 17, and the leading strut 14a which is secured therein. During this movement, the struts will slide in the rails until all the struts 14a...14f, with their guide elements 44, are parallel to each other within the receptor 17. The heads 45, sequentially, engage beneath and run under a leaf spring 62 (FIG. 2) which is secured to the upper wall of the receptor element 17 by rivets 63, shown only schematically. The free end of the leaf spring 62 is bent over in V-shape, as illustrated in FIG. 2, and extends through an opening 64 into the interior space defined by the receptor 17, close to the rearward end of the element 17. The spring force of the spring 63 is so adjusted that the bounce-back or resiliency of the web-strut combination is not sufficient to push the spring 62 out of the opening 64 and thus release a head 45 which is behind the V-end as shown in FIG. 2. Upon furhter pushing the strut 14f in the direction of the rear seat 6, the receptors 17 within the pockets 25, and which are in engagement with the lower side wall of the groove 23, are pushed counter the spring-loaded bolt 38 into the auxiliary pocket 33 so that the rear end of the receptor 17 will be released from the projection 31. Upon then lifting the rearmost strut 14f, the receptor 17 can be pivoted in the pockets 25 to lift the rear ends thereof over the projection 31. The spring-loaded end of the bolt 38 will engage in the forward end of the recess 36. Upon lifting of the last or rear strut 14f, the receptor can then be lifted above the projection 31 and all the struts 14a to 14f, together with the web portion 15 and the receptors 17, can be removed by upward tilting, out of the pockets 25 and through the opening 29. All of the struts are now packed tightly next to each other, are retained within the receptor 17 and are connected together, and held as a tight package by the spring 62. This is an easily handled package. The guide elements 44 are overlapped by the adjacent ends of the receptor. The struts cannot be removed endwise from the receptors 17, and, therefore, the ends of the struts 14a to 14f are also securely retained.

To reassemble the cover, the receptor 17 together with all the struts 14a to 14f therein are inserted in the pockets with movements counter those above described, and then permitting the receptor elements to snap in position, under force of the spring 41.

The spring-loaded push rod or bolt 38 holds the receptor 17 in engagement with the facing wall 27 of the fixed portion 16 of the guide rail 9, 11, respectively. Thus, all the struts 14b-14f can be easily pulled through the guide rails, the end or guide portions 44 easily bridging the junction between the retention element 17 and the end wall 27 of the guide rail portion 16. Simultaneously, and under force of the same spring pressure, the receptors 17 are prevented from removal and from rattling; they cannot snap out of their position due to the presence of the projection 31.

FIG. 4 illustrates an arrangement which can be used to further facilitate insertion of the receptors 17 into the pockets 25 through the insert opening 29. The opening 29 can be shaped such that the wall defining the opening expands funnel-shaped as shown at 66. FIG. 3 illustrates the receptor 17 in the pocket 25, in a top view, in which all the struts 14a...14f, together with the guide elements 44, are located within the receptor 17.

The receptors permit particularly simple handling, since they are located, when installed, in prolongation of the fixed guide rail portions 16, and are retained therein by spring-loaded holder arrangements, formed by the spring-loaded push rod or bolt 38. The spring-loaded of bolt 48 also prevents rattling of the entire system when the vehicle is in motion, for example traveling over a poor road surface.

The longitudinal reception pocket 25 to receive the reception 17 is simple, sturdy and easily manufactured. Insertion and removal of the strut-web combination 14, 15 likewise is simple. The pocket is open to the top and faces the opposite rail. Each one of the pockets is so arranged that insertion of the retention element is simple and, likewise, removal is equally simple, by forming the auxiliary recesses or pockets 33, 36 therein. The fit of the receptor 17 against the end portion 16 of the respective rails is preferably so arranged that the groove 51 and a similar matching groove in the receptor 17 are in alignment.

Interengaging projection-and-recess or snap means prevent the reception element from inadvertent release from the pocket 25 and the spring loading by spring 41 as well as by spring 62, when the web is gathered, prevent rattling or undesired noises. The projections 31, 32 defining the ends of the pockets reliably retain the receptor while the spring-loaded bolt or rod 38 permits ready removal of the receptor 17 and ensures tight seating, when desired, and prevents rattling.

The gap 51, defining the adjacent flanks of the guide groove, are preferably so arranged that the guide rails 9, 11 have an essentially C-shaped cross section. This prevents canted pulling-or pushing of the web-strut combination when it is extended to project the cover over the space 2, or to collapse the cover against the back of the back seat 6. A generally C-shaped cross-sectional profile readily permits the guide rails to hold the struts in interengaging position, especially if the struts are formed at their ends with matching end parts such as the end parts 44 (FIG. 5), and the parts 44 are made of easily slidable material.

Incorrect mounting of the guide rails, tolerances, distortions in the vehicle and the like, can be compensated for when at least one of the guide elements 44 of the respective struts is telescopically slidable with respect to a tubular portion, as explained in connection with FIG. 5. It is not necessary that both ends of the struts 14 have such a slidable element although better adjustability and centering is obtained when both ends are equipped with the end portions 44. If only one end is so equipped, the other should be shaped to define a head similar to the head 44; an identical element 44 can be inserted in the second end of the strut and fixedly retained therein, for example by upsetting or punching locking projections into the struts which bite into the plastic of the element 44.

Spring 62 (FIG. 2) is used, in accordance with a preferred embodiment of the invention, to retain the struts in gathereed position, and to hold the web in folded position when the cover is collapsed. Spring 62, in its simplest form, is merely a leaf spring with the V-shaped end.

In a preferred form of the invention, the surfaces which will be adjacent the receptor 17 upon removal or reinsertion, are preferably inclined to form guide or directing surfaces directing receptor 17 towards the final seating position.

Various changes and modifications may be made, and any features described herein may be used with any of the others within the scope of the inventive concept.

I claim;

1. Flexible, removable cover system for covering a confined space (2) open at the top, and delimited by side walls, particularly a luggage or trunk space of a motor vehicle, and especially of a hatchback or stationwagon automobile, comprising, a pair of essentially parallel spaced guide rails (9, 11) located in a common plane which extends across said space (2) and secured to said side walls;

a cover element (8) including
a plurality of struts (14, 14a...14f) extending between the guide rails and having their ends slidably received therein, and
a flexible web (15) connected to and secured to said struts, and maintaining said struts in position spaced from each other along the length of the rails when the cover element covers said space and said web (15) is stretched, and permitting pushing together and gathering of said struts and collapsing the web, said web being retained in position across said guide rails by said struts;

and a receptor means (17) located adjacent the terminal or end portion of said rails, having a length sufficient to to receive all said struts when gathered close to each other, said receptor element having a strut receiving portion in alignment with said guide rails and said receptor means being severable from said side walls and said guide rails together with gathered struts and the collapsed web.

2. The system of claim 1, wherein said receptor means (17) comprises a portion of the respective guide rail (9, 11).

3. The system of claim 1, wherein at least a portion (16) of the guide rails means (14) comprises an secured to a side wall (4) defining said confined space.

4. The system of claim 3, wherein the confined space comprises the trunk space of a motor vehicle and said portion (16) of the respective guide rail is installed on a side wall of the trunk space of the vehicle.

5. The system of claim 1, wherein said receptor element is located adjacent an end portion of the respective guide rail (9, 11).

6. The system of claim 1, wherein one (14a) of said struts is affixed to said receptor means.

7. The system of claim 1, wherein said receptor further includes a holder or retention section for said receptor means holding and retaining end portions of the struts (14a...14f) therein;

and wherein the holder or retention sections for the receptor means are aligned in said common plane and face each other.

8. The system of claim 7, wherein the holder or retention section (18) forms an extension portion of the end regions (16) of the respective guide rails (9, 11).

9. The system of claim 7, further including releasable retaining means (19) coupled to said holder or retention section to releasably retain the receptor means in position adjacent the terminal end portion of the rails.

10. The system of claim 7, wherein the holder or retention section (18) comprises an essentially rectangualr block-like element (21) formed with an elongated retention pocket (25) for retaining the receptor means therein and to permit removal of the plurality of struts and said receptor means conjointly;

said retention pockets (25) of the respective holder or retention sections associated with the respective rails facing each other and being open towards each other, and further formed with an insertion opening (29) extending at an essentially right angle with respect to said plane to permit introduction and removal of said receptor means (17) into said holder or retention section.

11. The system of claim 10, wherein the holder or retention section is fixedly installed against a side wall (4) defining said confined space and located to be in alignment with and match end portions (16) of the rails (9, 11) so that the retention pocket forms a prolongation of said guide rails (9, 11).

12. The system of claim 10, further including releasable retaining means (19) for securing said receptor means (17) in said retention pocket (25).

said releasable retaining means comprising a projection (32), a depression or auxiliary pocket portion (33) extending from said pocket and formed behind said projection, wherein the depth of the depression or auxiliary pocket portion (33) is larger than the extent of the projection (32);

and a resiliently biassed engagement element (38) extending into said depression or auxiliary pocket portion and directed to apply a resilient bias force against said receptor means (17) and biassing said receptor means (17) towards an end portion (16) of said rails (9, 11).

13. The system of claim 10, further including releasable retaining means (19) for securing said receptor means (17) in said retention pocket, wherein said releasable retaining means (19) comprises a projection (31) located adjacent a terminal end of the respective guide rail and overlapping, in part, said insertion opening (29);

a depression or auxiliary pocket portion (33) extending from said retention pocket (25) at the side remote from said projection (31) having a depth which is greater than the height of said projection (31);

and a resiliently biassed engagement element (38) extending into said depression or auxiliary pocket portion and directed to apply a resilient bias force against said receptor means (17) and biassing said receptor means (17) towards an end portion (16) of said rails (9, 11).

14. The system of claim 1, wherein the guide rails (9, 11) have, in cross section, an essentially C-shaped and wherein said plurality of struts have end portions shaped to provide an interengaging fit with said C-shaped rails.

15. The system of claim 1, wherein said plurality of struts (14a...14f) have guide elements (44) coupled to the ends thereof, said guide elements being slidably received in said rails.

16. The system of claim 15, wherein said struts are hollow, tubular elements;

and wherin said guide elements (44) are telescopically slidably received in said struts, and resiliently biassed to project from said struts.

17. The system of claim 1, further including resilient holder means (62) coupled to said receptor means (17) for resiliently and releasably retaining said struts in said receptor element.

18. The system of claim 17, wherein said holder means comprises a leaf spring (62).

19. The system of claim 10, wherein the holder or retention sections include an upper opening formed with a chamfered side surface to form a converging guide surface for facilitating insertion of the receptor means in said holder or retention pocket (25).

20. The system of claim 1, wherein said receptor means comprises a receptor element structure (17) which, at least in part, includ a rail section shaped to receive end portions of said struts.

* * * * *